US012812368B2

(12) United States Patent
Grayson et al.

(10) Patent No.: US 12,812,368 B2

(45) Date of Patent: Nov. 24, 2026

(54) SUBSCRIBER IDENTITY CONCEALMENT FROM ACCESS NETWORK PROVIDER

(71) Applicant: Cisco Technology, Inc., San Jose, CA (US)

(72) Inventors: Mark Grayson, Maidenhead (GB); Juan Carlos Zuniga, Montreal (CA)

(73) Assignee: Cisco Technology, Inc., San Jose, CA (US)

( * ) Notice: Subject to any disclaimer, the term of this patent is extended or adjusted under 35 U.S.C. 154(b) by 39 days.

(21) Appl. No.: 18/779,722

(22) Filed: Jul. 22, 2024

(65) Prior Publication Data

US 2025/0031034 A1 Jan. 23, 2025

Related U.S. Application Data

(60) Provisional application No. 63/514,778, filed on Jul. 20, 2023.

(51) Int. Cl.
*H04W 12/03* (2021.01)
*H04W 12/69* (2021.01)

(52) U.S. Cl.
CPC ........... *H04W 12/03* (2021.01); *H04W 12/69* (2021.01)

(58) Field of Classification Search
CPC ..... H04W 12/03; H04W 12/69; H04W 12/02; H04W 12/72
See application file for complete search history.

(56) References Cited

U.S. PATENT DOCUMENTS 10,904,070 B2 * 1/2021 Lo ........................ H04L 41/0609
11,165,573 B2 * 11/2021 Gasparini ........... G06F 21/6245
11,546,322 B1 * 1/2023 Hardjono .............. H04L 67/131
12,418,555 B1 * 9/2025 Skarphedinsson ........................... G06F 9/45533
2011/0122866 A1 * 5/2011 Vasamsetti .......... H04L 41/5009 370/352
2014/0068736 A1 * 3/2014 Agerstam ............. H04W 12/50 726/7
2017/0171200 A1 * 6/2017 Bao ........................ H04L 9/3213
2017/0180374 A1 * 6/2017 Gandhewar ......... H04L 63/0892
2018/0184340 A1 * 6/2018 Pularikkal ........... H04L 63/0892
2019/0253409 A1 * 8/2019 Spencer ................ H04L 63/108
2020/0084125 A1 * 3/2020 Chandrashekar ... H04L 65/1104

(Continued)

FOREIGN PATENT DOCUMENTS

AU 2012293712 A1 * 3/2014 ........... H04L 9/3268
EP 2053820 A1 4/2009

OTHER PUBLICATIONS

Adrangi F., et al., "Chargeable User Identity", Network Working Group, Request for Comments: 4372, Standards Track, Jan. 2006, pp. 1-10.

(Continued)

*Primary Examiner* — Gary S Gracia

(74) *Attorney, Agent, or Firm* — Merchant & Gould P.C.

(57) ABSTRACT

Subscriber identity concealment from an access network provider may be provided. A computing device may receive first identity data associated with a client device. Then the first identity data associated with the client device may be encrypted using second identity data to create an encrypted version of the first identity data associated with the client device. The encrypted version of the first identity data associated with the client device may be provided to an access network.

20 Claims, 3 Drawing Sheets

(56) References Cited

U.S. PATENT DOCUMENTS

| | | | | |
|---|---|---|---|---|
| 2023/0224704 | A1* | 7/2023 | Atarius | H04W 12/06 726/6 |
| 2023/0344913 | A1* | 10/2023 | Miller | H04L 67/306 |
| 2024/0129256 | A1* | 4/2024 | Bhola | H04L 43/106 |
| 2025/0031034 | A1* | 1/2025 | Grayson | H04W 12/02 |
| 2025/0260676 | A1* | 8/2025 | Arora | H04L 63/0428 |

OTHER PUBLICATIONS

International Search Report and Written Opinion for International Application No. PCT/US2024/039009, mailed Oct. 22, 2024, 17 Pages.

Rigney C., et al., "Remote Authentication Dial In User Service (RADIUS)", Network Working Group, Request for Comments: 2865, Obsoletes: 2138, Standards Track, Jun. 2000, pp. 1-76.

* cited by examiner

SUBSCRIBER IDENTITY CONCEALMENT FROM ACCESS NETWORK PROVIDER

RELATED APPLICATION TECHNICAL FIELD

Under provisions of 35 U.S.C. § 119(e), Applicant claims the benefit of U.S. Provisional Application No. 63/514,778 filed Jul. 20, 2023, which is incorporated herein by reference.

TECHNICAL FIELD

The present disclosure relates generally to providing subscriber identity concealment.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
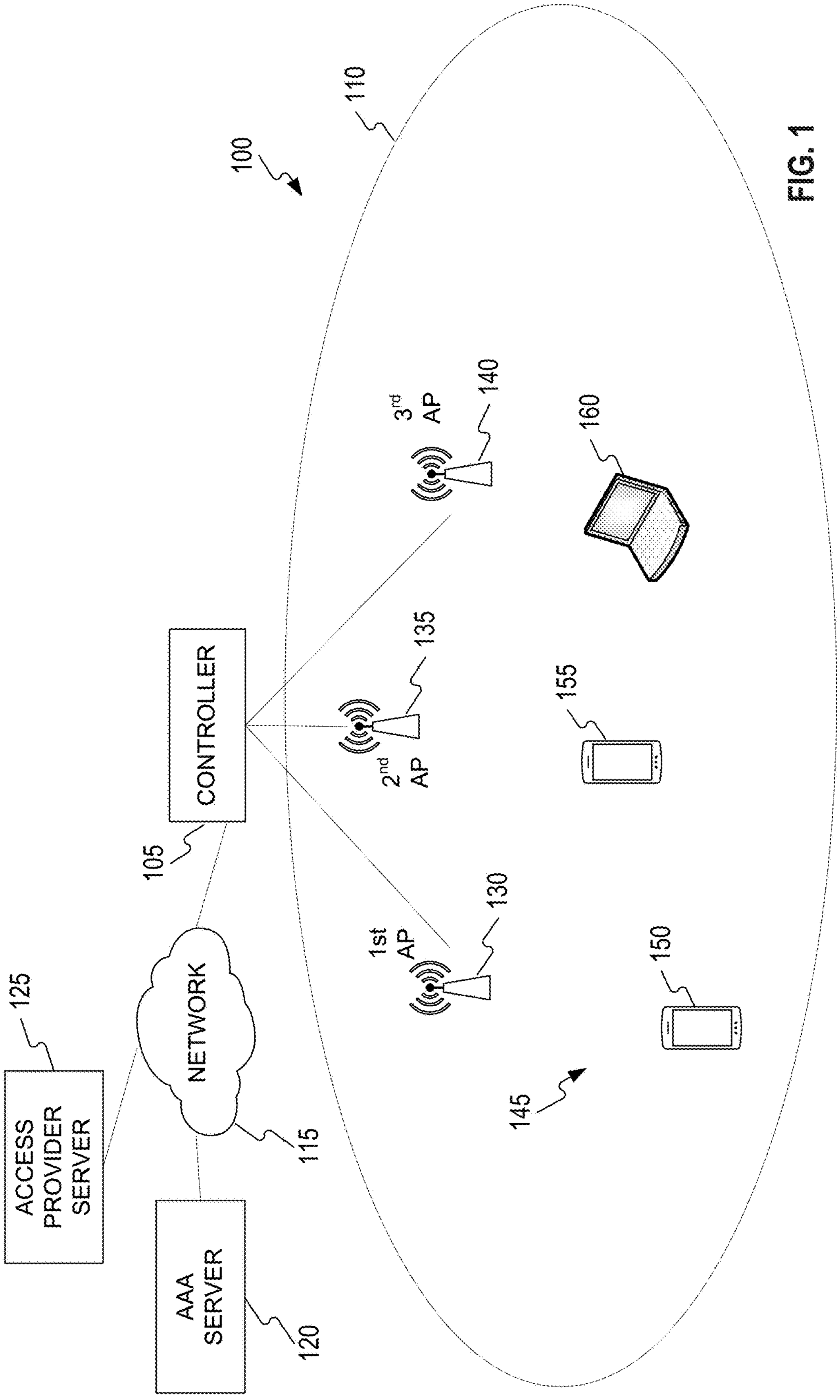
FIG. 1 is a block diagram of an operating environment for providing subscriber identity concealment.

Subscriber identity concealment from an access network provider may be provided. A computing device may receive first identity data associated with a client device. Then the first identity data associated with the client device may be encrypted using second identity data to create an encrypted version of the first identity data associated with the client device. The encrypted version of the first identity data associated with the client device may be provided to an access network.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

The Internet Engineering Task Force (IETF) is advancing recommendations in terms of ensuring end-user privacy when using Wi-Fi systems. OpenRoaming and other Remote Authentication Dial-In User Service (RADIUS) based systems may define the use of various attributes returned by an identity provider toward an access provider. For example, a Chargeable User Identity (CUI) may be used to signal an identity for a user that may be used by charging systems to be able to correlate an access authorization and corresponding accounting request exchanges to enable a charging record to be generated. Other examples of attributes returned may include a class attribute and a user name attribute that may be re-written by an identity provider. These attributes that may be defined to be used by the identity provider may be abused by an access provider in terms of correlating sessions and tracking users. Embodiments of the disclosure may limit the ability of access providers and intermediate proxies from using attributes to be able to correlate sessions and track users for example. Embodiments of the disclosure may permit concealment of identifiers over signaling links.

FIG. 1 shows an operating environment 100 for providing subscriber identity concealment. As shown in FIG. 1, operating environment 100 may comprise a controller 105, a coverage environment 110, a network 115, an Authentication, Authorization, and Accounting (AAA) server 120 (e.g., an identity provider), and an access provider server 125. Coverage environment 110 may comprise, but is not limited to, a Wireless Local Area Network (WLAN) comprising a plurality of Access Points (APs) that may provide wireless network access (e.g., access to the WLAN) for devices. The plurality of APs may comprise a first AP 130, a second AP 135, and a third AP 140. AAA server 120 may provide network access and may use two types of packets to manage the full AAA process. One packet type may comprise Access-Request, which manages authentication and authorization. Another packet type may comprise Accounting-Request, which manages accounting. Access provider server 125 may connect subscribers on the plurality of devices 145 to their immediate service provider. Each of the plurality of APs may be compatible with specification standards such as, but not limited to, the Institute of Electrical and Electronics Engineers (IEEE) 802.11 specification standard for example.

A plurality of devices 145 may be deployed in coverage environment 110. The plurality of APs may provide wireless network access to plurality of devices 145 as the devices move within coverage environment 110. Coverage environment 110 may comprise an outdoor or indoor wireless environment for Wi-Fi or any type of wireless protocol or standard.

Plurality of devices 145 may comprise a first client device 150, a second client device 155, and a third client device 160. Ones of plurality of devices 145 may comprise, but are not limited to, a smart phone, a personal computer, a tablet device, a mobile device, a telephone, a remote control device, a set-top box, a digital video recorder, an Internet-of-Things (IoT) device, a smart watch, a smart Television (TV), a wireless docking station, a network computer, a router, an AR/VR device, an Automated Transfer Vehicle (ATV), a drone, an Unmanned Aerial Vehicle (UAV), a smart wireless light bulb, or other similar microcomputer-based device.

Controller 105 may comprise a Wireless Local Area Network controller (WLC) and may provision and control coverage environment 110 (e.g., a WLAN). Controller 105 may allow plurality of client devices 145 to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide subscriber identity concealment.

The elements described above of operating environment 100 (e.g., controller 105, AAA server 120, access provider server 125, first AP 130, second AP 135, third AP 140, first client device 150, second client device 155, and third client device 160) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
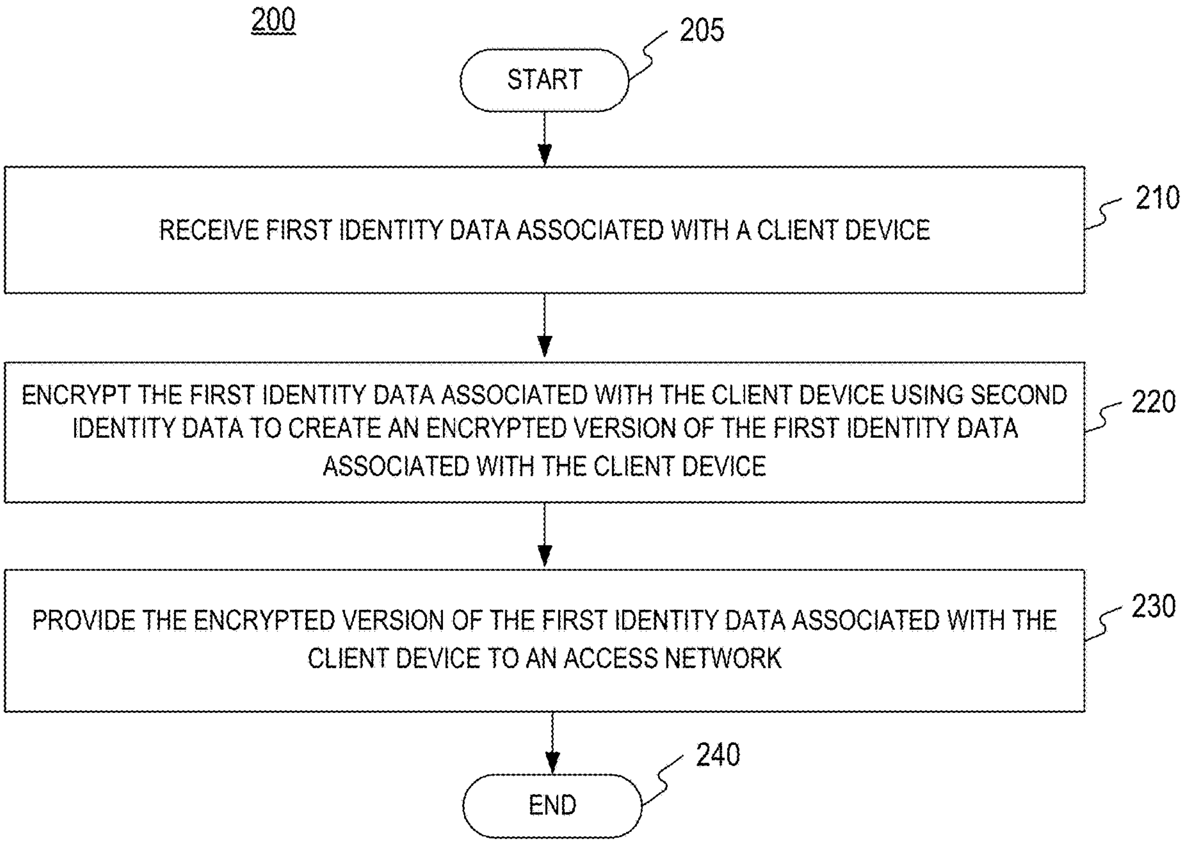
FIG. 2 is a flow chart of a method for providing subscriber identity concealment.

FIG. 2 is a flow chart setting forth the general stages involved in a method 200 consistent with embodiments of the disclosure for providing subscriber identity concealment. Method 200 may be implemented using computing device 300 as described in more detail below with respect to FIG. 3. Computing device 300 may be embodied by AAA server 120 for example. Ways to implement the stages of method 200 will be described in greater detail below.

Method 200 may begin at starting block 205 and proceed to stage 210 where computing device 300 (e.g., AAA server 120) may receive first identity data associated with a client device (e.g., first client device 150). For example, first client device 150 may be executing an Extensible Authentication Protocol (EAP) process with AAA server 120 for authentication. During this process, first client device 150 may provide AAA server 120 with information to allow AAA server 120 to determine the first identity data associated with first client device 150. The first identity data may comprise, but is not limited to, an identity that can be signaled in a RADIUS attribute. The first identity data may comprise, but is not limited to, an identity that can be signaled in a Chargeable User Identity (CUI), a class attribute, or a user name attribute for example. The RADIUS IETF CUI attribute 89 may comprise a single unique identifier for a given user visiting a remote regardless of the outer identity utilized during the EAP process or which device is used to log in. In other words, the CUI attribute may comprise an obscured version of the user's real username for example. Class attribute may comprise RADIUS IETF attribute 25. User name may comprise RADIUS IETF attribute 1.

From stage 210, where computing device 300 receives the first identity data associated with the client device, method 200 may advance to stage 220 where computing device 300 may encrypt the first identity data associated with the client device using second identity data to create an encrypted version of the first identity data associated with the client device. For example, in order to avoid access network providers colluding to be able to compare returned attributes and correlate values to allow tracking of individual users, the identity provider (e.g., AAA server 120) may hide (e.g., obfuscate) the first identity data (e.g., CUI, class attribute, or user name attribute).

In one embodiment encrypting may comprise using a hash function. Hashing may comprise a process of using a mathematical function to convert an input of any length into an encrypted output of a fixed length. This hash function may include using the second identity data (e.g., an identifier of the access network comprising data associated with the access network). In one embodiment, the data associated with the access network may comprise the operator-name RADIUS IETF attribute 126 for example. The first identity data may comprise a permanent identifier <perm-id>. The second identity data may comprise <operator-name>. The permanent identifier <perm-id> may be transformed into a <concealed-id>, where <concealed-id>=hash (<perm-id>, <operator-name>) for example. The encrypted version of the first identity data associated with the client device may comprise <concealed-id>.

In order to avoid access network providers from being able to correlate separate signaling exchanges between separate exchanges, the hash function may also include a time-variable parameter (e.g., temporal data). In one embodiment, the time-variable parameter may be based on event-time-stamp RADIUS IETF attribute 55 for example. In order to enable some time-limited correlation for troubleshooting, the time-variable parameter may be the integer division of the epoch time with the period of time that is sufficient for troubleshooting. For example, a permanent identifier <perm-id> may be transformed into a <concealed-id>, where <concealed-id>=hash (<perm-id>, (<event-timestamp>)).

In another embodiment, the second identity data may comprise data associated with the access network and temporal data. In this case AAA server 120 may perform a hash using both variables: <concealed-id>=hash (<perm-id>, <operator-name>, (<event-timestamp>)).

Once computing device 300 encrypts the first identity data associated with the client device using second identity data in stage 220, method 200 may continue to stage 230 where computing device 300 may provide the encrypted version of the first identity data associated with the client device to access provider server 125. For example, AAA server 120 may provide <concealed-id> to access provider server 125 rather than <perm-id> thus embodiments of the disclosure may permit concealment of identifiers over signaling links. Once computing device 300 provides the encrypted version of the first identity data associated with the client device to access provider server 125 in stage 230, method 200 may then end at stage 240.

Figure 3:
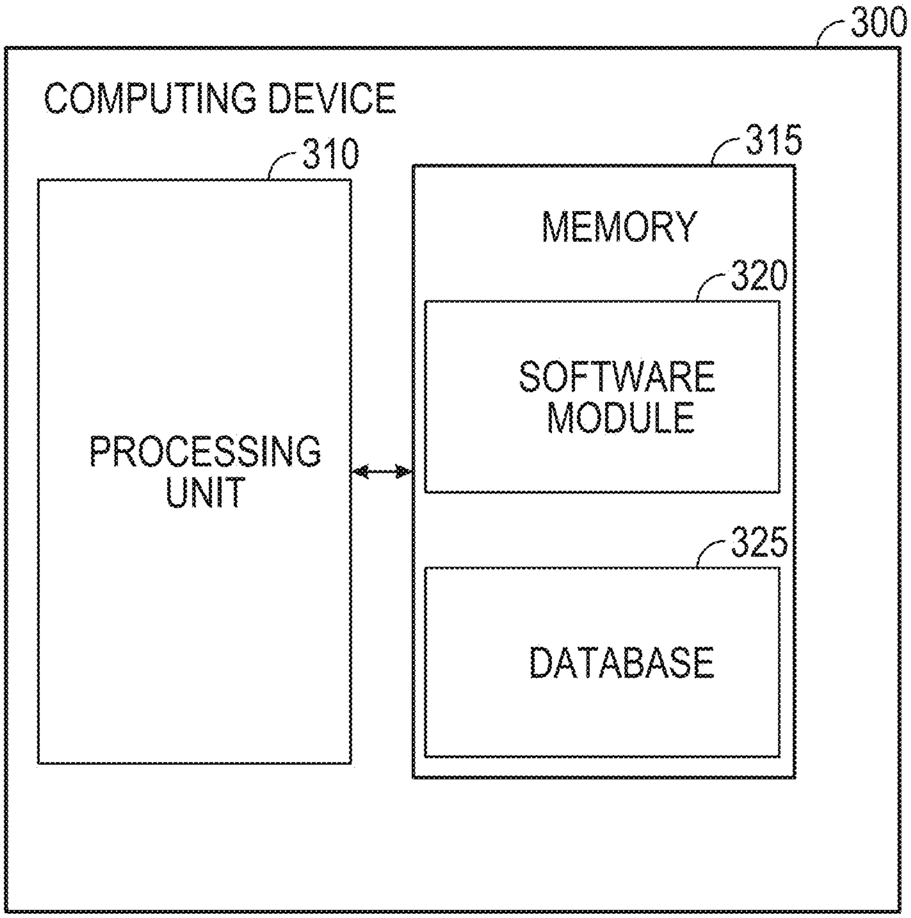
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing subscriber identity concealment as described above with respect to FIG. 2. Computing device 300, for example, may provide an operating environment for controller 105, AAA server 120, access provider server 125, first AP 130, second AP 135, third AP 140, first client device 150, second client device 155, and third client device 160. Controller 105, AAA server 120, access provider server 125, first AP 130, second AP 135, third AP 140, first client device 150, second client device 155, and third client device 160 may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:

receiving, by a computing device, first identity data associated with a client device;

encrypting the first identity data associated with the client device using second identity data to create an encrypted version of the first identity data associated with the client device, wherein encrypting the first identity data associated with the client device using the second identity data comprises hashing the first identity data associated with the client device using an identifier of the access network and a time variable parameter, wherein the time-variable parameter is generated based on an integer division of an epoch time with a troubleshooting time period, and wherein the encrypted version of the first identity data is different for different access networks and different troubleshooting time periods for the same first identity data associated with the client device; and providing the encrypted version of the first identity data associated with the client device to an access network, wherein the encrypted version is provided to an access provider server in place of the first identity data.

2. The method of claim 1, wherein the first identity data associated with the client device comprises a Chargeable User Identity (CUI).

3. The method of claim 2, wherein the CUI comprises a single unique identifier for a given user, and wherein the single unique identifier comprises an obscured version of a real username of the user.

4. The method of claim 1, wherein the first identity data associated with the client device comprises a class attribute.

5. The method of claim 1, wherein the first identity data associated with the client device comprises a user name attribute.

6. The method of claim 1, wherein the time-variable parameter comprises an event timestamp.

7. The method of claim 1, wherein receiving the first identity data associated with the client device comprises receiving the first identity data associated with the client device in response to the client device executing an Extensible Authentication Protocol (EAP) process with the computing device for authentication.

8. The method of claim 1, wherein the computing device comprises an Authentication, Authorization, and Accounting (AAA) server.

9. The system of claim 1, wherein the first identity data associated with the client device is received in response to the client device executing an Extensible Authentication Protocol (EAP) process with the computing device for authentication.

10. A system comprising:

a memory storage; and a processing unit coupled to the memory storage, wherein the processing unit is operative to:

receive first identity data associated with a client device;

encrypt the first identity data associated with the client device using second identity data to create an encrypted version of the first identity data associated with the client device, wherein the processing unit being operative to encrypt the first identity data associated with the client device using the second identity data comprises the processing unit being operative to hash the first identity data associated with the client device using an identifier of an access network and a time variable parameter, wherein the time-variable parameter is generated based on an integer division of an epoch time with a troubleshooting time period, and wherein the encrypted version of the first identity data is different for different access networks and different troubleshooting time periods for the same first identity data associated with the client device; and provide the encrypted version of the first identity data associated with the client device to the access network.

11. The system of claim 10, wherein the first identity data associated with the client device comprises one of a Chargeable User Identity (CUI), a class attribute, and a user name attribute.

12. The system of claim 11, wherein the CUI comprises a single unique identifier for a given user, and wherein the single unique identifier comprises an obscured version of a real username of the user.

13. The system of claim 10, wherein the time-variable parameter comprises an event timestamp.

14. The system of claim 10, comprising an Authentication, Authorization, and Accounting (AAA) server.

15. A non-transitory computer-readable medium that stores a set of instructions which when executed perform a method executed by the set of instructions comprising:

receiving, by a computing device, first identity data associated with a client device;

encrypting the first identity data associated with the client device using second identity data to create an encrypted version of the first identity data associated with the client device, wherein encrypting the first identity data associated with the client device using the second identity data comprises hashing the first identity data associated with the client device using an identifier of the access network and a time variable parameter, wherein the time-variable parameter is generated based on an integer division of an epoch time with a troubleshooting time period, and wherein the encrypted version of the first identity data is different for different access networks and different troubleshooting time periods for the same first identity data associated with the client device; and providing the encrypted version of the first identity data associated with the client device to an access network, wherein the encrypted version is provided to an access provider server in place of the first identity data.

16. The non-transitory computer-readable medium of claim 15, wherein the first identity data associated with the client device comprises one of a Chargeable User Identity (CUI), a class attribute, and a user name attribute.

17. The non-transitory computer-readable medium of claim 16, wherein the CUI comprises a single unique identifier for a given user, and wherein the single unique identifier comprises an obscured version of a real username of the user.

18. The non-transitory computer-readable medium of claim 15, wherein the time-variable parameter comprises an event timestamp.

19. The non-transitory computer-readable medium of claim 15, wherein receiving the first identity data associated with the client device comprises receiving the first identity data associated with the client device in response to the client device executing an Extensible Authentication Protocol (EAP) process with the computing device for authentication.

20. The non-transitory computer-readable medium of claim 15, wherein the computing device comprises an Authentication, Authorization, and Accounting (AAA) server.

* * * * *